3,371,095
THIO- OR DITHIO-PHOSPHORIC (-PHOSPHONIC OR -PHOSPHINIC) ACID ESTERS AND PROCESSES FOR THE PRODUCTION THEREOF
Walter Lorenz, Wuppertal-Vohwinkel, and Gerhard Schrader, Wuppertal-Cronenberg, Germany, assignors to Farbenfabriken Bayer Aktiengesellschaft, Leverkusen, Germany, a German corporation
No Drawing. Filed Aug. 17, 1964, Ser. No. 390,195
Claims priority, application Germany, Aug. 27, 1963, F 40,594/63
16 Claims. (Cl. 260—294.8)

ABSTRACT OF THE DISCLOSURE

Pesticidal phosphorus compounds of the formula

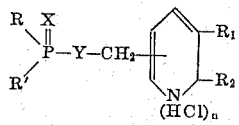

wherein R is lower alkyl, alkoxy or aryl, R' is lower alkyl or alkoxy $R_1$ and $R_2$ are hydrogen or, together, a fused benzene ring, X and Y are oxygen or sulfur, at least one of which is sulfur and $n$ is zero or one.

---

The present invention relates to and has as its objects novel and useful, pesticidally, especially insecticidally and acaricidally active, phosphorus containing compounds as well as a process for the production thereof. More specifically this invention is concerned with thio- or dithio-phosphoric (-phosphonic or -phosphinic) acid esters of the general structure

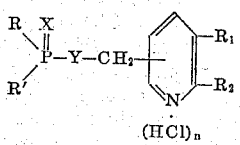

In the above formula R and R' stand for the same or different preferably lower alkyl or alkoxy radicals, and R can also be an aryl radical, preferably a phenyl radical, $R_1$ and $R_2$ are hydrogen atoms or form together a fused benzene ring, X and Y are oxygen or sulphur atoms, at least one of the last mentioned symbols being sulphur, and the index $n$ has the value 0 or 1.

Products of the aforesaid constitution have hitherto not been known from the literature. When attempts are made to produce the compounds in question in the usual manner by reaction of dialkyl or alkyl aryl-(thio)phosphoric (-phosphonic or -phosphinic) acid halides with the corresponding pyridine or quinoline carbinols or their hydrochlorides, no reaction takes place, but the starting materials remain unchanged. In accordance with the present invention it has now been found that thio- or dithio-phosphoric (-phosphonic or -phosphinic) acid esters of the aforesaid structure can be obtained smoothly and with good yields if dialkyl or alkylaryl phosphorous (-phosphonous or -phosphinous) acid halides of the formula

are reacted with pyridine- or quinoline-carbinols of the general constitution

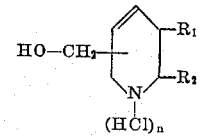

and the resulting intermediate products which are trivalent compounds of phosphorus are treated, expediently without previous isolation, with elementary sulphur, or if thio- or dithio-phosphoric (-phosphonic or -phosphinic) acids of the general formula

are reacted with halomethylpyridine or -quinoline derivatives of the formula

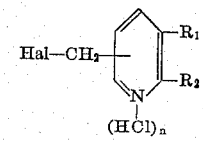

In the last mentioned formulae the symbols R, R', $R_1$, $R_2$, X and $n$ have the meanings given above, while Hal stands for a halogen atom.

The process according to the invention is preferably carried out in the presence of inert organic solvents. Primary examples of these are aromatic hydrocarbons, such as benzene, toluene, chlorobenzene, xylene, and low-boiling aliphatic ketones and nitriles, e.g. acetone, methyl ethyl ketone, methyl isopropyl ketone, and methyl isobutyl ketone, and also acetonitrile and propionitrile.

The reaction is advantageously performed in the presence of acid acceptors. When reacting phosphorus (phosphonous or phosphinous) acid halides with the corresponding pyridine- or quinoline-carbinols, tertiary amines such as triethylamine or dimethylaniline, serve well as acid-binding agents while the variant of the reaction using thio- or dithio-phosphoric (-phosphonic or -phosphinic) acids with halomethylpyridines or -quinolines is expediently carried out with the employment of the corresponding thio- or dithio-phosphoric (-phosphonic or -phosphinic) acid salts, preferably the alkali metal or ammonium salts.

The process according to the invention is conducted preferably at room temperature or at temperatures somewhat higher or lower (0 to 45° C., preferably 20 to 30° C.). Since the reaction sometimes proceeds, however, with more or less strongly positive development of heat, the temperature of the mixture must, if necessary, be kept within the stated range by occasional external cooling.

Furthermore, it is of advantage for achieving good yields and obtaining pure products, to carry out the reaction, if necessary, in a protective gas atmosphere (by passing through an inert gas current) and also to continue stirring the reaction mixture after combining the starting components, for some time (1 to 3 hours), if necessary with heating to the stated temperatures.

The pyridine- or quinoline-carbinols needed as starting materials are known and commercially obtainable in large quantities. The corresponding halomethyl compounds have also been described already (cf. e.g. F.S. Orm and L. D. Edivy, Collection Czechoslov. Chem. Communs. 13 (1948), 289 to 299) and can be readily produced, even on a technical scale, according to the instructions given in the literature.

The thio- or dithio-phosphoric (-phosphonic or -phosphinic) acid esters obtainable according to the present invention occur mainly in the form of colourless or pale yellow to dark red coloured, water-insoluble oils, which, in some cases, can be distilled under strongly reduced pressure; the corresponding hydrochlorides, on the other hand, are solid crystalline substances with sharp melting points, which can be readily further purified by recrystallizing from the customary solvents.

The products of the invention possess outstanding pesticidal, especially insecticidal, ovicidal and acaricidal properties and therefore find application as plant protective or pest control agents. The new compounds of the present invention very effectively kill insects like aphids, bugs, spider mites, caterpillars, cockroaches, flies, beetles, termites, ticks etc. They distinguish themselves especially by a good contact-insecticidal activity and mostly also by a strong systemic and ovicidal action. At the same time they have an activity on eating insects such as caterpillars. Most surprisingly they are of remarkably low toxicity against mammals. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc. The following examples are given for the purpose of illustrating the invention.

*Example 1*

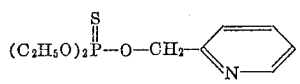

55 grams (0.5 mol) of pyridine-2-carbinol are dissolved in 500 cc. of acetonitrile. 55 grams of triethylamine are added to this solution and then there are added dropwise to the reaction mixture with stirring and simultaneous passing through of nitrogen at 20 to 30° C., 79 g. (0.5 mol) of O,O-diethyl phosphorous acid monochloride. The mixture is stirred for a further hour and then treated with 16 g. finely powdered sulphur. The temperature of the mixture thereby rises to 30 to 40° C. After the exothermic reaction has subsided, the reaction mixture is stirred for a further 2 hours, 300 cc. ice water are then added, the organic phase is separated, dried over sodium sulphate, and the solvent removed in vacuum. The remaining residue is heated at 60° C. under a pressure of 1 mm. Hg for 20 minutes. 80 grams (61% of the theoretical) of O,O-diethylthionophosphoric acid-O-[pyridyl-(2)-methyl] ester are obtained as a pale yellow, water-insoluble oil.

*Analysis.*—Calculated for a molecular weight of 261: P, 11.9%; N, 5.4%; S, 12.3%. Found: P, 12.3%; N, 5.6%; S, 12.5%.

*Example 2*

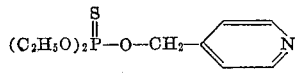

To a solution of 55 g. (0.5 mol) of pyridine-4-carbinol in 400 cc. of benzene, there are first added 55 g. of triethylamine. The reaction mixture is then treated dropwise with stirring and simultaneous passing through of nitrogen at 20 to 30° C., with 79 g. (0.5 mol) of O,O-diethyl phosphorous acid monochloride. 16 grams of finely powdered sulphur are thereafter added to the mixture with further stirring. The temperature of the latter rises to 35 to 40° C. The exothermic reaction is allowed to subside and the material is then stirred for a further 2 hours. The mixture is then worked up as described in Example 1. There is obtained the O,O-diethylthionophosphoric acid-O-[pyridyl-(4)-methyl] ester in the form of a colourless water-insoluble oil. The yield amounts to 85 g. (65% of the theoretical).

*Analysis.*—Calculated for a molecular weight of 261: P, 11.9%; N, 5.4%; S, 12.3%. Found: P, 12.1%; N, 5.4%; S, 12.7%.

*Example 3*

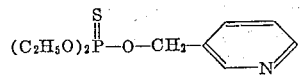

55 grams (0.5 mol) of pyridine-3-carbinol are dissolved in 400 cc. of benzene, and 55 g. of triethylamine are first added to this solution and then there are added dropwise at 20 to 30° C. with simultaneous passing through of nitrogen 79 g. of O,O-diethyl phosphorous acid monochloride. The mixture is then stirred for a further hour at 20° C. and then mixed with 16 g. of finely powdered sulphur. The temperature of the mixture thereby rises to 30 to 40° C. After the exothermic reaction has subsided, the material is stirred for a further 2 hours and then worked up as described in Example 1. 95 grams (73% of the theoretical) of the O,O-diethylthionophosphoric acid-O-[pyridyl-(3)-methyl] ester are obtained as a pale yellow water-insoluble oil.

*Analysis.*—Calculated for a molecular weight of 261: N, 5.4%; S, 12.3%; P, 11.9%. Found: N, 5.39%; S, 11.9%; P, 12.1%.

*Example 4*

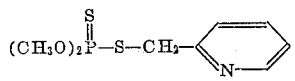

To a suspension of 42 g. (0.24 mol) of O,O-dimethylthionophosphoric acid-O-[pyridyl-(3)-methyl] ester are acetone there are added dropwise 26 g. (0.2 mol) of 2-chloromethyl pyridine [B.P. 42 to 45° C., produced according to K. Winterfeld and K. Flick, Arch. Pharmaz. Berichte der deutschen pharmazeutischen Gesellschaft, vol. 289/61, p. 448 (1956); W. Mathes and H. Schüly, Zeitschrift für Angewandte Chemie, vol. 75 (1963) pp. 235 to 240]. Ammonium chloride separates without significant heat development. To complete the reaction, the reaction mixture is further heated for 2 hours at 40° C. After cooling the mixture, the separated salts are filtered off with suction and the solvent extentively removed from the filtrate in vacuum. The remaining oil is taken up in benzene, the benzene solution is washed with water, dried over sodium sulphate and freed from solvent. As residue there are obtained 36 g. (72.2% of the theoretical) of the O,O-dimethylthionothiol-phosphoric acid-S-[pyridyl-(2)-methyl] ester in the form of a thinly liquid orange coloured undistillable oil.

*Analysis.*—Calculated for $C_8H_{12}O_2NS_2P$ (molecular weight 249.3): N, 5.62%; S, 25.72%. Found: N, 5.73%; S, 25.58%.

On rats per os the mean toxicity of the compound ($DL_{50}$) amounts to 50 mg. per kg. animal weight.

*Example 5*

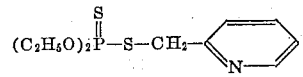

49 grams (0.3 mol) of 2-chloromethyl pyridinium hydrochloride (M.P. 128° C.) are suspended in 200 cc. of acetone. To this suspension 35 g. (0.33 mol) of triethylamine are added dropwise with cooling at 20° C., followed immediately by mixing with 73 g. (0.33 mol) of O,O-diethyl-thionothiol-phosphoric acid ammonium salt. Without significant heat development, the reaction sets in which is completed by two hours' heating of the mixture at 40° C. After cooling the reaction mixture, the separated salt-like precipitate is filtered off with suction and the solvent removed from the filtrate by distillation. The remaining brown residue is taken up in ether, the ether solution is decanted from the insoluble resins, washed with water, dried over calcium chloride and the solvent removed in vacuum. The remaining O,O-diethyl-thionothiol-phosphoric acid-S-[pyridyl-(2)-methyl] ester goes over at 105 to 106° C. under a pressure of 0.01 mm. Hg. The yield amounts to 57 g. (68% of the theoretical).

Analysis.—Calculated for $C_{10}H_{16}O_2NS_2P$ (molecular weight 227.3): N, 5.05%; S, 23.12%; P, 11.17%. Found: N, 4.93%; S, 23.41%; P, 11.03%.

On rats per os the mean toxicity of the compound amounts to 10 to 20 mg. per kg. animal weight.

*Example 6*

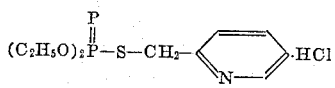

66 grams (0.4 mol) of 2-chloromethyl-pyridinium hydrochloride are dissolved in 150 cc. of ethanol and 20 cc. of water. The mixture thereby cools to −1° C. After adding 46 g. (0.55 mol) of sodium bicarbonate, the reaction mixture is stirred for 10 minutes and then treated dropwise with 90 g. (0.44 mol) of O,O-diethyl-thionothiol-phosphoric acid ammonium salt at 0 to 5° C. The mixture is then heated at 40 to 50° C. for two hours; when it is cold, the salts are filtered off with suction and the filtrate is poured into water. The separated oil is taken up in ether, the ether solution is washed with a little water and carefully dried over calcium chloride. On passing hydrogen chloride into the solution, the hydrochloride of the above structure is obtained in crystalline form. By recrystallising from ethyl acetate (solubility 1 g./10 cc.) the compound is obtained in the form of colourless leaflets of M.P. 54° C. The yield amounts to 49 g. (39.1% of the theoretical).

Analysis.—Calculated for $C_{10}H_{16}O_2NS_2P \cdot HCl$ (molecular weight 313.8): N, 4.46%; S, 20.43%; P, 9.87%; Cl, 11.30%. Found: N, 4.26%; S, 20.38%; P, 9.77%; Cl, 11.04%.

On rats per os the product has a mean toxicity ($DL_{50}$) of about 25 mg. per kg. animal weight.

*Example 7*

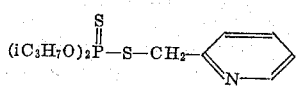

To a solution of 56 g. (0.24 mol) of O,O-diisopropyl-thionothiol-phosphoric acid ammonium salt in 150 cc. of acetone, 26 g. (0.2 mol) of 2-chloromethyl-pyridine are added dropwise at 20° C., the mixture is heated at 40° C. for a further 2 hours and, after cooling, the separated salts are filtered off with suction. The solvent is removed from the filtrate in vacuum and the remaining oil is taken up in petroleum ether. The petroleum ether solution is washed with water and sodium bicarbonate solution, the organic phase is dried over sodium sulphate and the solvent distilled off. There remain 57 g. (92.8% of the theoretical) of the O,O-diisopropylthionothiol-phorphoric acid-S-[pyridyl-(2)-methyl] ester as a slightly viscous, red and undistillable oil.

Analysis.—Calculated for $S_{12}H_{20}O_2NS_2P$ (molecular weight 306.4): N, 4.57%; S, 20.93%. Found: N, 4.48%; S, 21.35%.

On rats per os the mean toxicity of the compound amounts to 250 mg. per kg. animal weight.

*Example 8*

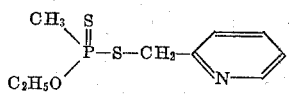

47.5 grams (0.24 mol) of methyl-O-ethyl-thionothiol-phosphoric acid potassium salt are suspended in 250 cc. of acetone. To this suspension 26 g. (0.2 mol) of 2-chloromethyl-pyridine are added dropwise at 20° C. The reaction takes place without appreciable development of heat. To complete the reaction, the mixture is heated at 40° C. for a further 2 hours and, when the latter has cooled, the separated salts are filtered off with suction. The solvent is removed from the filtrate in vacuum and the remaining oil taken up in benzene. After washing the benzene solution several times with water, it is dried over sodium sulphate and the solvent is again distilled off. 42 grams remain (85.2% of the theoretical) of the methylthionothiol-phosphonic acid-O-ethyl-S-[pyridyl-(2)-methyl] ester in the form of a thinly liquid, pale red oil, which is not distillable.

Analysis.—Calculated for $C_9H_{14}ONS_2P$ (molecular weight 247.3): N, 5.66%; S, 25.92%. Found: N, 5.86%; S, 25.44%.

*Example 9*

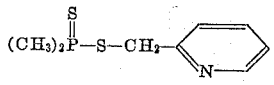

40 grams (0.24 mol) of dimethyl-thionothiol-phosphinic acid potassium salt are suspended in 250 cc. of acetone, this suspension is treated dropwise with 26 g. (0.2 mol) of 2-chloromethyl-pyridine, then heated at 40° C. for two hours and, when it has cooled, the separated salts are filtered from the mixture with suction. The solvent is removed from the filtrate in vacuum and the remaining oil is taken up in benzene. The working up of the reaction mixture proceeds in the manner repeatedly described above. There are obtained 35 grams (80.7% of the theoretical) of the dimethyl-thionothiol-phosphinic acid-S-[pyridyl-(2)-methyl] ester in the form of a dark red, non-crystallizing oil.

Analysis.—Calculated for $C_8H_{12}NS_2P$ (molecular weight 217.3): N, 6.45%; S, 29.51%. Found: N, 6.71%; S, 29.61%.

On rats per os the mean toxicity of the compound amounts to 25 to 30 mg. per kg. animal weight.

*Example 10*

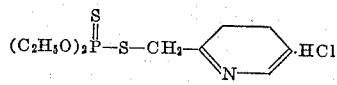

A solution of 49 g. (0.3 mol) of 3-chloromethyl pyridinium hydrochloride in 100 cc. of ethanol and 10 cc. of water is first mixed slowly with 34 g. (0.4 mol) of sodium bicarbonate and then with 82 g. (0.4 mol) of O,O-diethyl-thionothiol-phosphoric acid ammonium salt. After heating at 40 to 45° C. for two hours it is cooled and poured into 500 cc. of water. The separated oil is taken up in ether, the ether solution is washed with water until the reaction is neutral and dried over calcium chloride. After saturating the organic phase with hydrogen chloride, the hydrochloride of the O,O-diethyl-thionothiol-phosphoric acid-S-[pyridyl-(3)-methyl] ester is obtained which, after recrystallizing from ethyl acetate, melts at 100° C. with decomposition. The yield amounts to 55 g. (58.6% of the theoretical).

Analysis.—Calculated for $C_{10}H_{17}O_2NClS_2P$ (molecular weight 313.8): N, 4.46%; S, 20.44%; P, 9.87%; Cl, 11.30%. Found: N, 4.47%; S, 20.39%; P, 9.84%; Cl, 11.01%.

Example 11

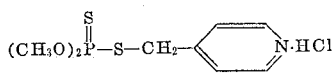

49 grams (0.3 mol) of 4-chloromethyl-pyridinium hydrochloride are dissolved in 100 cc. of methanol and 10 cc. of water. Into this solution, 34 g. (0.4 mol) of sodium bicarbonate are introduced slowly followed by 70 g. (0.4 mol) of O,O-dimethyl-thionothiol-phosphoric acid ammonium salt, and the mixture is stirred for one hour at 40 to 45° C. After cooling the reaction mixture, the contents of the flask is poured into 500 cc. of water, the separated oil is taken up in ether, the ether solution is washed with water until the reaction is neutral, and dried over calcium chloride. On passing hydrogen chloride into the organic phase, the hydrochloride of the O,O-dimethyl-thionothiol-phosphoric acid-S-[pyridyl-(4)-methyl] ester precipitates in crystalline form. The product melts at 100° C. with decomposition. The yield amounts to 52 g. (60.7% of the theoretical).

*Analysis.*—Calculated for $C_8H_{13}O_2NClS_2P$ (molecular weight 285.8): N, 4.90%; S, 22.44%; P, 10.84%; Cl, 12.40%. Found: N, 4.98%; S, 22.62%; P, 10.33%; Cl, 12.35%.

On rats per os the mean toxicity ($DL_{50}$) of the compound amounts to 250 mg. per kg. animal weight.

Example 12

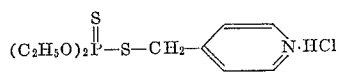

49 grams (0.3 mol) of 4-chloromethyl-pyridinium hydrochloride are dissolved in 100 cc. of ethanol and 10 cc. of water, and 34 g. (0.4 mol) of sodium bicarbonate are slowly introduced followed by the addition of 82 g. (0.4 mol) of O,O-diethyl-thionothiol-phosphoric acid ammonium salt. After heating the mixture at 40 to 45° C. for two hours, it is poured into 500 cc. of water, and the separated oil is taken up in ether. The ether solution is washed with water until the reaction is neutral, and then dried over calcium chloride. On passing hydrogen chloride into the ether solution, the hydrochloride of the O,O-diethyl-thionothiol-phosphoric acid-S-[pyridyl-(4) - methyl] ester precipitates, which can be recrystallised from methyl ethyl ketone and then melts at 127° C. The yield amounts to 44 g. (46.7% of the theoretical).

*Analysis.*—Calculated for $C_{10}H_{17}O_2NClS_2P$ (molecular weight 318.7): N, 4.46%; S, 20.44%; P, 9.87%; Cl, 10.30%. Found: N, 4.36%; S, 20.45%; P, 9.52%; Cl, 11.31%.

On rats per os the mean toxicity of the compound amounts to 10 mg. per kg. animal weight.

Example 13

As example for the special utility the inventive compounds mentioned below have been tested with respect to their insecticidal, ovicidal and acaricidal activity upon administration against aphids (contact-insecticidal action), spider mites, caterpillars, flies, mosquito larvae, grain weevils and aphids on oats (systemic action).

Aqueous dilutions of the active compounds have been prepared by mixing the active ingredients with the same amounts of dimethyl formamide as an auxiliary solvent adding thereto 20% by weight referred to active ingredient of a commercial emulsifier consisting of a benzyl hydroxyl polyglycol ether containing about 10 to 15 glycol ethers, and diluting this premixture at least with water to the desired concentration indicated in the following paragraphs:

The tests have been carried out as follows:

(a) Against aphids (species *Doralis fabae* contact insecticidal action): Heavily infested bean plants (*Vicia faba*) have been sprayed drip wet with solutions as prepared above. The effect has been determined by evaluation after 24 hours by counting the dead pests either on the surface of the soil or still remaining on the plants. The following results have been obtained:

| Compound according to Example No. | Aqueous concentration of active ingredient/ water (percent) | Killing rate of pests (percent) |
| --- | --- | --- |
| 2 | 0.1 | 100 |
| 5 | 0.01 | 100 |
| 6 | 0.01 | 100 |
| 8 | 0.001 | 80 |
| 9 | 0.01 | 100 |
| 10 | 0.01 | 100 |
| 12 | 0.01 | 100 |

(b) Against mites (contact-insecticidal and ovicidal action): Bean plants (*Phaseolus vulgaris*) of about 15 inches height are sprayed drip wet with solutions prepared as indicated above. The bean plants have been infested heavily with the two-spotted spider (species *Tetranychus telarius*). Evaluation has been carried out after 24 hours, 48 hours, 8 days. The following results have been obtained:

| Compound according to Example No. | Aqueous concentration of active ingredient/ water (percent) | Killing rate of pests (percent) |
| --- | --- | --- |
| 1 | 0.1 | 100 |
| 2 | 0.01 | 100 |
| 3 | 0.01 | 95 |
| 5 | 0.001 | 90 (ovicidal action) |
| 6 | 0.001 | 90 (ovicidal action) |
| 7 | 0.01 | 80 |
| 8 | 0.001 | 100 (ovicidal action) |
| 9 | 0.01 | 90 |
| 11 | 0.001 | 95 |
| 12 | 0.01 | 100 (ovidical action) |
| 12 | 0.001 | 60 action) |

(c) Against caterpillars of the type of the type diamond black moth *Plutella maculipennis*: white cabbage has been sprayed drip wet with aqueous emulsions are prepared above in a concentration as shown below. Caterpillars (10 each) have been placed on the sprayed leaves of the white cabbage. The living status has been determined after 24 and 48 hours. The following results have been determined:

| Compound according to Example No. | Aqueous concentration of active ingredient/ water (percent) | Killing rate of pests (percent) |
| --- | --- | --- |
| 4 | 0.1 | 100 |
| 10 | 0.1 | 100 |

(d) Against flies: about 50 flies (*Musca domestica*) are placed under covered petri dishes in which drip wet filter papers have been placed which are sprayed with insecticidal solutions of concentrations as shown below. The living status of the flies has been determined after 24 hours. The following results have been obtained:

| Compound according to Example No. | Aqueous concentration of active ingredient/ water (percent) | Killing rate of pests (percent) |
| --- | --- | --- |
| 7 | 0.01 | 100 |

(e) Against mosquito larvae of the type *Aedes aegypti*: about 20 larvae were brought into diluted aqueous emulsions prepared as described above. Counting of the dead pests occurred after 24 hours. The following results have been obtained:

| Compound according to Example No. | Aqueous concentration of active ingredient/ water (percent) | Killing rate of pests (percent) |
| --- | --- | --- |
| 1 | 0.001 | 100 |

(f) Against grain weevils. About 20 pests were placed under covered petri dishes in which drip wet filter paper has been placed. This filter paper is sprayed drip wet with an insecticidal solution prepared as indicated above and in a concentration as shown below. The living status of the grain weevils has been determined after 24 hours. The following results have been determined:

| Compound according to Example No. | Aqueous concentration of active ingredient/water (percent) | Killing rate of pests (percent) |
|---|---|---|
| 4 | 0.01 | 100 |

(g) Against aphids on oats (systemic action). Oat plants (Avena sativa) which have been strongly infested with oat aphids (Rhopalosiphum padi) are watered with the preparation of the active compound so that the preparation penetrates into the soil without wetting the leaves of the oat plants. The active compound is taken up by the oat plants from the soil and thus reached the infested leaves. After specified periods of time, the degree of destruction is determined.

The following results have been obtained:

| Compound according to Example No. | Aqueous concentration of active ingredient/water (percent) | Killing rate of pests (percent) |
|---|---|---|
| 3 | 0.1 | 100 |
| 11 | 0.1 | 100 |

We claim:
1. A compound of the formula

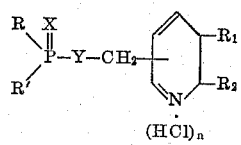

(HCl)$_n$ in which R stands for a member selected from the group consisting of lower alkyl up to 4 carbon atoms, lower alkoxy up to 4 carbon atoms and phenyl, R' stands for a member selected from the group consisting of lower alkyl up to 4 carbon atoms and lower alkoxy up to 4 carbon atoms and in which R$_1$ and R$_2$ stand for members selected from the group consisting of hydrogen and a fused benzene nucleus, n stands for a member selected from the group consisting of zero and 1 and X and Y stand for a member selected from the the group consisting of oxygen and sulphur with the proviso that at least one of the symbols X and Y is sulphur.

2. A compound of the formula

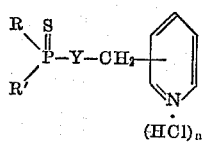

(HCl)$_n$ in which R and R' stand for members selected from the group consisting of lower alkyl up to 4 carbon atoms and lower alkoxy up to 4 carbon atoms, Y stands for a member selected from the group consisting of oxygen and sulphur and n stands for a member selected from the group consisting of zero and 1.

3. A compound of the formula

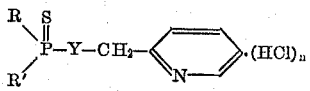

in which R and R' stand for members selected from the group consisting of lower alkyl up to 4 carbon atoms and lower alkoxy up to 4 carbon atoms, Y stands for a member selected from the group consisting of oxygen and sulphur and n stands for a member selected from the group consisting of zero and 1.

4. A compound according to claim 3 in which R and R' stand for lower alkoxy up to 4 carbon atoms, Y stands for a member selected from the group consisting of oxygen and sulphur and n stands for a member selected from the group consisting of zero and 1.

5. A compound according to claim 3 in which R stands for lower alkyl up to 4 carbon atoms, R' stands for lower alkoxy up to 4 carbon atoms, Y stands for sulphur and n stands for zero.

6. A compound according to claim 3 in which R and R' stand for lower alkyl up to 4 carbon atoms, Y stands for sulphur and n stands for zero.

7. A compound of the formula

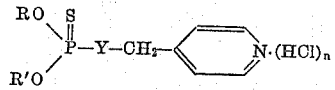

in which R and R' stand for lower alkyl up to 4 carbon atoms, Y stands for a member selected from the group consisting of oxygen and sulphur and n stands for a member selected from the group consisting of zero and 1.

8. A compound of claim 7 in which R and R' stand for lower alkyl up to 4 carbon atoms, Y stands for sulphur and n for zero.

9. A compound of claim 7 in which R and R' stand for lower alkyl up to 4 carbon atoms, Y stands for sulphur and n for 1.

10. A compound of the formula

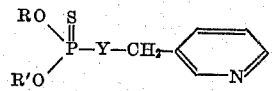

in which R and R' stand for lower alkyl up to 4 carbon atoms and in which Y stands for a member selected from the group consisting of oxygen and sulphur.

11. The compound of the formula

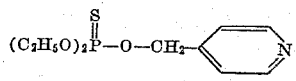

12. The compound of the formula

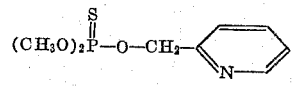

13. The compound of the formula

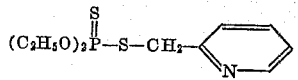

14. The compound of the formula

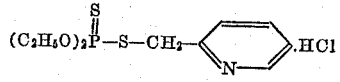

15. The compound of the formula

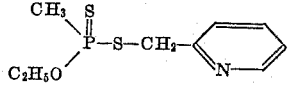

16. The compound of the formula

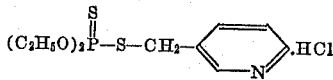

References Cited

UNITED STATES PATENTS

| 2,889,330 | 6/1959 | Baker et al. | 260—294 |
| 3,284,455 | 11/1966 | Fest et al. | 260—283 |
| 2,881,201 | 4/1959 | Schrader | 260—941 |

JOHN D. RANDOLPH, *Primary Examiner.*

WALTER A. MODANCE, *Examiner.*

A. L. ROTMAN, *Assistant Examiner.*